(12) United States Patent
Ha et al.

(10) Patent No.: US 8,907,013 B2
(45) Date of Patent: *Dec. 9, 2014

(54) POLYCARBONATE RESIN COMPOSITION AND MOLDED PRODUCT USING THE SAME

(75) Inventors: Doo-Han Ha, Uiwang-si (KR); Young-Chul Kwon, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 388 days.

This patent is subject to a terminal disclaimer.

(21) Appl. No.: 12/980,718

(22) Filed: Dec. 29, 2010

(65) Prior Publication Data

US 2011/0281995 A1   Nov. 17, 2011

(30) Foreign Application Priority Data

May 17, 2010   (KR) ........................ 10-2010-0046096

(51) Int. Cl.
| | |
|---|---|
| C08L 53/00 | (2006.01) |
| C08F 8/00 | (2006.01) |
| C08L 83/10 | (2006.01) |
| C08L 69/00 | (2006.01) |
| C08L 33/10 | (2006.01) |
| C08L 33/08 | (2006.01) |
| C08L 83/00 | (2006.01) |
| C08L 33/06 | (2006.01) |
| C08G 77/448 | (2006.01) |

(52) U.S. Cl.
CPC ............... *C08L 69/00* (2013.01); *C08L 83/10* (2013.01); *C08L 83/00* (2013.01); *C08L 33/06* (2013.01); *C08G 77/448* (2013.01); *C08L 33/10* (2013.01); *C08L 2205/03* (2013.01); *C08L 2205/02* (2013.01); *C08L 33/08* (2013.01)
USPC .............. 525/100; 525/92; 525/101; 524/506

(58) Field of Classification Search
USPC .............................. 525/100, 92, 101; 524/506
See application file for complete search history.

(56) References Cited

U.S. PATENT DOCUMENTS

| | | | |
|---|---|---|---|
| 3,686,355 | A | 8/1972 | Gaines et al. |
| 4,027,073 | A | 5/1977 | Clark |
| 4,045,514 | A | 8/1977 | Iwahashi et al. |
| 4,263,416 | A | 4/1981 | Liu et al. |
| 4,287,315 | A | 9/1981 | Meyer et al. |
| 4,289,859 | A | 9/1981 | Kalinowski et al. |
| 4,400,333 | A | 8/1983 | Neefe |
| 4,554,302 | A | 11/1985 | Miller |
| 4,745,029 | A | 5/1988 | Kambour |
| 4,906,696 | A | 3/1990 | Fischer et al. |
| 5,061,558 | A | 10/1991 | Fischer et al. |
| 5,200,492 | A | 4/1993 | Ohnaga et al. |
| 5,280,070 | A | 1/1994 | Drzewinski et al. |
| 5,284,916 | A | 2/1994 | Drzewinski |
| 5,292,809 | A | 3/1994 | Drzewinski et al. |
| 5,449,557 | A | 9/1995 | Liebler et al. |
| 5,451,632 | A | 9/1995 | Okumura et al. |
| 5,473,019 | A | 12/1995 | Siol et al. |
| 5,530,083 | A | 6/1996 | Phelps et al. |
| 6,001,929 | A | 12/1999 | Nodera et al. |
| 6,252,002 | B1 | 6/2001 | Yamada et al. |
| 6,576,706 | B1 | 6/2003 | Nodera et al. |
| 6,646,068 | B2 | 11/2003 | Chisholm et al. |
| 7,067,188 | B1 | 6/2006 | Yang et al. |
| 7,294,659 | B2 | 11/2007 | Yatake |
| 7,365,125 | B2 | 4/2008 | Govaerts et al. |
| 7,553,895 | B2 | 6/2009 | An et al. |
| 7,732,515 | B2 | 6/2010 | Jang et al. |
| 8,410,238 | B2 | 4/2013 | Ko et al. |
| 2002/0042483 | A1 | 4/2002 | Vanderbilt |
| 2003/0065071 | A1 | 4/2003 | Scholten |
| 2005/0101757 | A1 | 5/2005 | Glasgow et al. |
| 2006/0004154 | A1 | 1/2006 | DeRudder et al. |
| 2006/0030647 | A1 | 2/2006 | Ebeling et al. |
| 2006/0047037 | A1 | 3/2006 | Kawato et al. |
| 2006/0074156 | A1 | 4/2006 | Ebeling et al. |
| 2007/0105994 | A1 | 5/2007 | Li et al. |
| 2007/0213452 | A1 | 9/2007 | Kawato et al. |
| 2007/0293608 | A1 | 12/2007 | Chen et al. |
| 2008/0015291 | A1 | 1/2008 | Siripurapu et al. |
| 2008/0029744 | A1 | 2/2008 | Jansen et al. |
| 2008/0227896 | A9 | 9/2008 | Ebeling et al. |
| 2009/0023871 | A9 | 1/2009 | Fujiguchi et al. |
| 2009/0080079 | A1 | 3/2009 | Kogure et al. |
| 2009/0118402 | A1 | 5/2009 | Jang et al. |
| 2009/0318629 | A1 | 12/2009 | Adoni et al. |
| 2010/0029855 | A1 | 2/2010 | Matsuoka et al. |
| 2010/0113697 | A1 | 5/2010 | Lee et al. |
| 2010/0152357 | A1 | 6/2010 | Kwon et al. |
| 2010/0168272 | A1 | 7/2010 | Park et al. |
| 2010/0240831 | A1 | 9/2010 | Kim et al. |
| 2010/0256288 | A1 | 10/2010 | Kim et al. |

(Continued)

FOREIGN PATENT DOCUMENTS

| | | |
|---|---|---|
| CN | 101434749 A | 5/2009 |
| CN | 101735586 A | 6/2010 |

(Continued)

OTHER PUBLICATIONS

European Search Report in commonly owned European Application No. 09180634 dated Feb. 2, 2010, pp. 1-3.

(Continued)

*Primary Examiner* — Nathan M Nutter

(74) *Attorney, Agent, or Firm* — Additon, Higgins & Pendleton, P.A.

(57) ABSTRACT

Disclosed are a polycarbonate resin composition that includes (A) about 5 wt % to about 89 wt % of a polycarbonate resin; (B) about 10 wt % to about 94 wt % of a polycarbonate-polysiloxane copolymer; and (C) about 1 wt % to about 70 wt % of a modified acrylic-based copolymer, and a molded product made using the polycarbonate thermoplastic resin composition.

26 Claims, 2 Drawing Sheets

(56) References Cited

U.S. PATENT DOCUMENTS

| | | | |
|---|---|---|---|
| 2011/0009524 | A1 | 1/2011 | Kwon et al. |
| 2011/0021677 | A1 | 1/2011 | Kwon et al. |
| 2011/0040019 | A1 | 2/2011 | Kwon et al. |
| 2011/0160380 | A1 | 6/2011 | Kwon et al. |
| 2012/0129993 | A1* | 5/2012 | Ha et al. .................. 524/230 |
| 2013/0137801 | A1* | 5/2013 | Ha et al. .................. 524/115 |

FOREIGN PATENT DOCUMENTS

| | | | |
|---|---|---|---|
| EP | 1010725 | A2 | 6/2000 |
| EP | 1533340 | A1 | 5/2005 |
| EP | 1555296 | A1 | 7/2005 |
| EP | 2204412 | A1 | 7/2010 |
| GB | 2057464 | A | 4/1981 |
| JP | 04-023856 | A | 1/1992 |
| JP | 04-359954 | A | 12/1992 |
| JP | 06-313089 | A | 11/1994 |
| JP | 2001-049072 | A | 2/2001 |
| JP | 2002-080676 | | 3/2002 |
| JP | 2005-247999 | A | 9/2005 |
| JP | 2006-131833 | | 5/2006 |
| JP | 2006-249288 | A | 9/2006 |
| JP | 2006-249292 | A | 9/2006 |
| JP | 2006-257126 | | 9/2006 |
| JP | 2006-257284 | A | 9/2006 |
| JP | 2006-342246 | A | 12/2006 |
| JP | 2010-202825 | A | 9/2010 |
| KR | 10-2000-0048033 | A | 7/2000 |
| KR | 2004-79118 | A | 9/2004 |
| KR | 10-2006-0050497 | A | 5/2006 |
| KR | 10-0767428 | B1 | 10/2007 |
| KR | 10-2009-0018827 | A | 2/2009 |
| KR | 10-2009-0020648 | A | 2/2009 |
| KR | 10-2009-0026339 | | 3/2009 |
| KR | 10-2009-0035031 | A | 4/2009 |
| KR | 10-2009-0066204 | A | 6/2009 |
| KR | 10-2010-0049458 | A | 5/2010 |
| WO | 2007/119920 | A1 | 10/2007 |
| WO | 2007/140101 | A1 | 12/2007 |
| WO | 2008/081791 | A1 | 7/2008 |
| WO | 2009/078593 | A1 | 6/2009 |
| WO | 2009/078602 | A1 | 6/2009 |
| WO | 2009/113762 | A2 | 9/2009 |
| WO | 2009/116722 | A1 | 9/2009 |
| WO | 2009/128601 | A1 | 10/2009 |
| WO | 2012/015109 | A1 | 2/2012 |

OTHER PUBLICATIONS

Xu, "Predicition of Refractive Indices of Linear Polymers by a four-descriptor QSPR model", Polymer, 45 (2004) pp. 8651-8659.
Office Action in commonly owned U.S. Appl. No. 12/642,904 mailed Dec. 14, 2011, pp. 1-9.
Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).
Office Action in commonly owned U.S. Appl. No. 12/631,018 mailed Nov. 8, 2011, pp. 1-10.
European Search Report in commonly owned European Application No. 10196806 dated Apr. 27, 2011, pp. 1-5.
International Search Report in commonly owned International Application No. PCT/KR2010/008651 dated Aug. 25, 2011, pp. 1-2.
European Search Report in commonly owned European Application No. 08862371 dated Dec. 7, 2010, pp. 1-6.
International Search Report in commonly owned International Application No. PCT/KR2008/006870, dated May 28, 2009, pp. 1-2.
European Search Report and Written Opinion in commonly owned European Application No. 11186686.9 dated Mar. 6, 2012, pp. 1-5.
International Search Report in commonly owned International Application No. PCT/KR2008/007157, dated May 28, 2009, pp. 1-2.
Office Action in commonly owned U.S. Appl. No. 12/792,176 mailed Nov. 16, 2011, pp. 1-12.
International Search Report in commonly owned International Application No. PCT/KR2008/007825, dated Aug. 28, 2009, pp. 1-2.
Office Action in commonly owned U.S. Appl. No. 12/880,209 mailed Feb. 16, 2011, pp. 1-10.
Final Office Action in commonly owned U.S. Appl. No. 12/880,209 mailed Jul. 29, 2011, pp. 1-9.
Advisory Action in commonly owned U.S. Appl. No. 12/880,209 mailed Nov. 4, 2011, pp. 1-4.
International Search Report in commonly owned International Application No. PCT/KR2008/007820 dated Jul. 28, 2009, pp. 1-2.
Final Office Action in commonly owned U.S. Appl. No. 12/642,904 mailed Mar. 27, 2012, pp. 1-7.
Notice of Allowance in commonly owned U.S. Appl. No. 12/642,904 mailed Jul. 2, 2012, pp. 1-8.
European Search Report in commonly owned European Application No. 08873425.6 dated May 29, 2012, pp. 1-5.
Office Action in commonly owned U.S. Appl. No. 12/884,549 mailed Aug. 21, 2012, pp. 1-12.
Final Office Action in commonly owned U.S. Appl. No. 12/792,176 mailed Apr. 19, 2012, pp. 1-10.
Advisory Action in commonly owned U.S. Appl. No. 12/792,176 mailed Aug. 23, 2012, pp. 1-4.
Final Office Action in commonly owned U.S. Appl. No. 12/631,018 mailed Apr. 26, 2012, pp. 1-12.
Mark, Physical Properties of Polymers Handbook, 2nd Edition, Polymer Research Center and Department of Chemistry, University of Cincinnati, OH, (2007) Springer, pp. 5-7.
Office Action in commonly owned U.S. Appl. No. 13/931,952 mailed Jul. 30, 2014, pp. 1-9.
Chinese Office Action in commonly owned Chinese Application No. 201110314363.9, dated Nov. 5, 2013, pp. 1-9.
English translation of Chinese Office Action in commonly owned Chinese Application No. 201110314363.9, dated Nov. 5, 2013, pp. 1-8.
Office Action in commonly owned U.S. Appl. No. 13/269,653 mailed Dec. 9, 2013, pp. 1-11.

* cited by examiner

POLYCARBONATE RESIN COMPOSITION AND MOLDED PRODUCT USING THE SAME

CROSS-REFERENCE TO RELATED APPLICATIONS

This application claims priority to and the benefit of Korean Patent Application No. 10-2010-0046096 filed in the Korean Intellectual Property Office on May 17, 2010, the entire disclosure of which is incorporated herein by reference.

FIELD OF THE INVENTION

The present invention relates to a polycarbonate resin composition and a molded product made using the same.

BACKGROUND OF THE INVENTION

Polycarbonate resin has excellent toughness, impact resistance, thermal stability, self-extinguishing property, dimensional stability, and heat resistance. Accordingly, polycarbonate resins have been widely used in a variety of products, such as electric and electronic products and automobile parts, and as a substitute for glass, for example in lens. However, when polycarbonate resins are used in a product requiring transparency, the polycarbonate product can have reduced scratch resistance as compared to a glass product and further the product can yellow over time when exposed to sunlight.

Polymethylmethacrylate (PMMA) resin has excellent weather resistance, transparency, adherence and strength such as flexural strength and flexural strain differing from polycarbonate resin. PMMA resin has accordingly been used in various applications such as adhesives, lighting materials, and building materials. However, PMMA has inferior impact strength, so it may not be useful for reduced thickness products requiring impact strength.

When polycarbonate resin is alloyed with PMMA resin, the alloy is expected to have both excellent impact resistance and excellent scratch resistance. However, compatibility of the two resins is low and the difference between their refractive indices is large. Accordingly, the resultant products are generally opaque, can have a poor quality appearance, and can have deteriorated impact resistance and scratch resistance.

Currently, products can be painted or coated with specialty coatings to provide a luxurious appearance such as a high gloss. These techniques, however, requires several processing steps, can increase defect rates, and can generate hazardous volatilize components, which can increase the costs.

In order to solve these problems, a material that does not requiring painting or coating has been developed. There is still a need, however, for a product which exhibits a good balance of several different properties, such as impact resistance, heat resistance, scratch resistance and the like.

SUMMARY OF THE INVENTION

The present invention provides a polycarbonate thermoplastic resin composition that can have excellent impact resistance, scratch resistance, transparency, heat resistance, fluidity, and coloring properties.

The present invention further provides a molded product made using the polycarbonate thermoplastic resin composition.

According to the present invention, a polycarbonate resin composition is provided that includes (A) about 5 wt % to about 89 wt % of a polycarbonate resin; (B) about 10 wt % to about 94 wt % of a polycarbonate-polysiloxane copolymer; and (C) about 1 wt % to about 70 wt % of a modified acrylic-based copolymer.

The polycarbonate resin may have a melt flow index (MFI) of about 3 to about 120 g/10 min.

The polycarbonate-polysiloxane copolymer may include about 1 wt % to about 99 wt % of a polycarbonate block and about 1 wt % to about 99 wt % of a polysiloxane block.

The modified acrylic-based copolymer may be a copolymer of an aromatic acrylic-based compound, an alicyclic acrylic-based compound, or a combination thereof and a compound that is capable of being copolymerized therewith, i.e., a compound that is capable of being copolymerized with the aromatic acrylic-based compound, alicyclic acrylic-based compound, or combination thereof.

Examples of the aromatic and alicyclic acrylic-based compounds may include without limitation cyclohexyl(meth)acrylate, ethylphenoxy(meth)acrylate, 2-ethylthiophenyl(meth)acrylate, 2-ethylaminophenyl(meth)acrylate, phenyl(meth)acrylate, benzyl(meth)acrylate, 2-phenylethyl(meth)acrylate, 3-phenylpropyl(meth)acrylate, 4-phenylbutyl(meth)acrylate, 2-(2-methylphenyl)ethyl(meth)acrylate, 2-(3-methylphenyl)ethyl(meth)acrylate, 2-(4-methylphenyl)ethyl(meth)acrylate, 2-(4-propylphenyl)ethyl(meth)acrylate, 2-(4-(1-methylethyl)phenyl)ethyl(meth)acrylate, 2-(4-methoxyphenyl)ethyl(meth)acrylate, 2-(4-cyclohexylphenyl)ethyl(meth)acrylate, 2-(2-chlorophenyl)ethyl(meth)acrylate, 2-(3-chlorophenyl)ethyl(meth)acrylate, 2-(4-chlorophenyl)ethyl(meth)acrylate, 2-(4-bromophenyl)ethyl(meth)acrylate, 2-(3-phenylphenyl)ethyl(meth)acrylate, 2-(4-benzylphenyl)ethyl(meth)acrylate, and combination thereof.

Examples of the compound that is capable of being copolymerized therewith may include without limitation alkyl methacrylates, alkyl acrylates, unsaturated carboxylic acids, acid anhydrides, hydroxyl group-containing acrylates, amides, nitriles, epoxy group containing compounds such as allyl glycidylether and glycidylmethacrylate, aromatic vinyl-based compounds, and combinations thereof.

The modified acrylic-based copolymer may have a weight average molecular weight of about 5,000 g/mol to about 50,000 g/mol, for example about 10,000 g/mol to about 40,000 g/mol.

The polycarbonate-polysiloxane copolymer and the modified acrylic-based copolymer may be mixed at a weight ratio of about 12:88 to about 99:1.

The polycarbonate resin composition may further include carbon black.

The polycarbonate resin composition may further include one or more additives comprising an antibacterial agent, a heat stabilizer, an antioxidant, a release agent, light stabilizer, an inorganic material additive, a surfactant, a coupling agent, a plasticizer, an admixture, a stabilizer, a lubricant, an antistatic agent, a coloring aid, a flame proofing agent, a weather-resistance agent, a colorant, an ultraviolet (UV) absorber, an ultraviolet (UV) blocking agent, a flame retardant, a filler, a nucleating agent, an adhesion aid, an adhesive, or a combination thereof.

The present invention further provides, a molded product made from the polycarbonate resin composition.

Hereinafter, further aspects of the present invention will be described in detail.

The polycarbonate resin composition can have an excellent balance of various properties such as impact resistance, scratch resistance, transparency, heat resistance, fluidity, and/or coloring properties. Thus the polycarbonate resin composition of the invention can eliminate the need for painting or coating processes, and can be used in the production of various molded products such as electronic parts, automobile parts, and the like.

DETAILED DESCRIPTION

Figure 1:
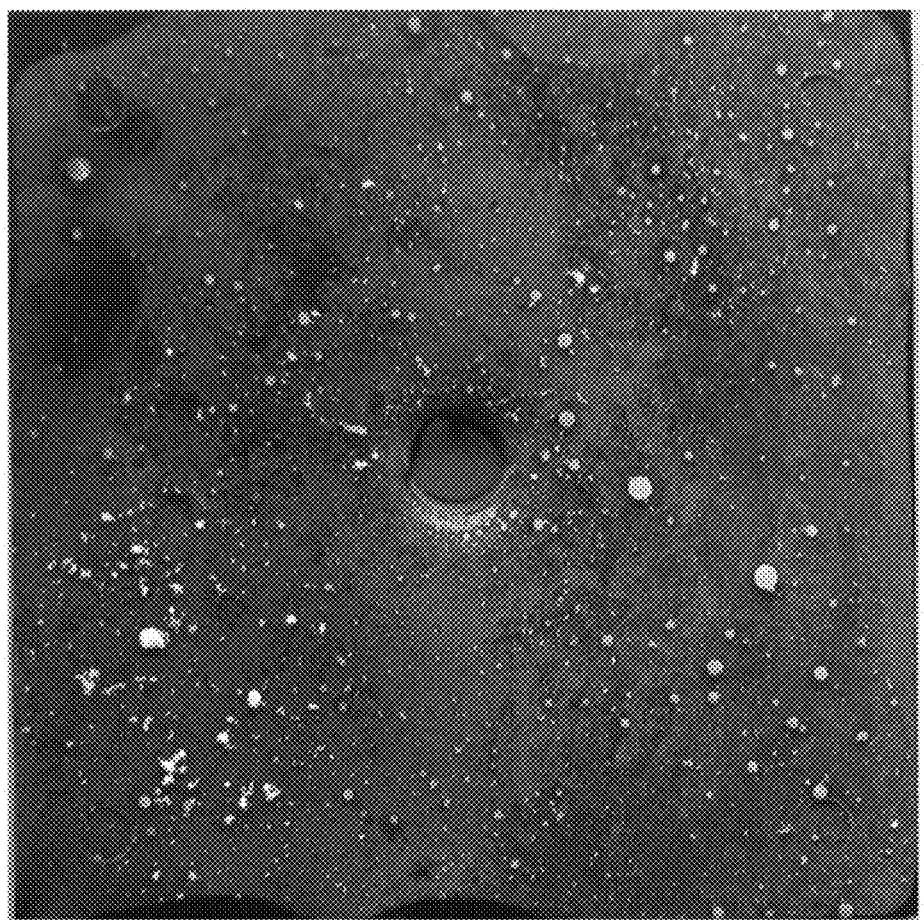
FIG. 1 is a photograph showing the ductile state of a specimen according to Example 11 after measuring FDI (Falling Dart Impact).

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "(meth)acrylate" refers to both "acrylate" and "methacrylate.".

As used herein, when a specific definition is not otherwise provided, the term "substituted" refers to one substituted with at least one substituent including a halogen (F, Cl, Br, I), a hydroxy group, a nitro group, cyano group, an amino group, an azido group, an amidino group, a hydrazino group, a hydrazono group, a carbonyl group, a carbamyl group, a thiol group, an ester group, a carboxyl group or a salt thereof, sulfonic acid group or a salt thereof, phosphoric acid group or a salt thereof, a C1 to C20 alkyl group, a C2 to C20 alkenyl group, a C2 to C20 alkynyl group, a C1 to C20 alkoxy group, a C6 to C30 aryl group, a C6 to C30 aryloxy group, a C3 to C30 cycloalkyl group, a C3 to C30 cycloalkenyl group, a C3 to C30 cycloalkynyl group, or a combination thereof, in place of hydrogen.

The polycarbonate resin composition according to one embodiment includes a polycarbonate resin, a polycarbonate-polysiloxane copolymer, and a modified acrylic-based copolymer.

Exemplary components included in the polycarbonate resin composition according to embodiments will hereinafter be described in detail.

(A) Polycarbonate Resin

The polycarbonate resin may be prepared by reacting one or more diphenols of the following Chemical Formula 1 with a compound of phosgene, halogen acid ester, carbonate ester, or a combination thereof.

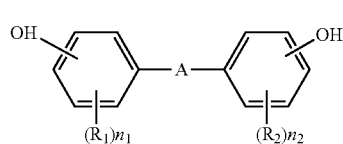

[Chemical Formula 1]

In the above Chemical Formula 1,

A is a linker comprising a single bond, substituted or unsubstituted C1 to C30 linear or branched alkylene, substituted or unsubstituted C2 to C5 alkenylene, substituted or unsubstituted C2 to C5 alkylidene, substituted or unsubstituted C1 to C30 linear or branched haloalkylene, substituted or unsubstituted C5 to C6 cycloalkylene, substituted or unsubstituted C5 to C6 cycloalkenylene, substituted or unsubstituted C5 to C10 cycloalkylidene, substituted or unsubstituted C6 to C30 arylene, substituted or unsubstituted C1 to C20 linear or branched alkoxylene, halogen acid ester, carbonate ester, CO, S, or $SO_2$, each $R_1$ and $R_2$ independently includes substituted or unsubstituted C1 to C30 alkyl or substituted or unsubstituted C6 to C30 aryl, and $n_1$ and $n_2$ are independently integers ranging from 0 to 4.

The diphenols represented by the above Chemical Formula 1 may be used in combinations to constitute repeating units of the polycarbonate resin. Exemplary diphenols include without limitation hydroquinone, resorcinol, 4,4'-dihydroxydiphenyl, 2,2-bis(4-hydroxyphenyl)propane (referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)-ketone, bis(4-hydroxyphenyl)ether, and the like, and combinations thereof. In exemplary embodiments, the diphenol can include 2,2-bis(4-hydroxyphenyl)-propane, 2,2-bis(3,5-dichloro-4-hydroxyphenyl)-propane, or 1,1-bis(4-hydroxyphenyl)-cyclohexane. In other exemplary embodiments, the diphenol can include 2,2-bis(4-hydroxyphenyl)-propane.

In exemplary embodiments, the polycarbonate resin can have a weight average molecular weight ranging from about 10,000 g/mol to about 200,000 g/mol, for example about 15,000 g/mol to about 80,000 g/mol, but the molecular weight of the polycarbonate is not limited thereto.

The polycarbonate resin may further include mixtures of polycarbonate resins obtained using two or more diphenols that are different from each other. The polycarbonate resin may also include a linear polycarbonate resin, a branched polycarbonate resin, a polyester carbonate copolymer, and the like, or a combination thereof.

The linear polycarbonate resin may include a bisphenol-A based polycarbonate resin. The branched polycarbonate resin may include one produced by reacting a multi-functional aromatic compound such as trimellitic anhydride, trimellitic acid, and the like with diphenols and carbonate. The multi-functional aromatic compound may be included in an amount of about 0.05 to about 2 mol % based on the total weight of the branched polycarbonate resin. The polyester carbonate copolymer resin may include one produced by reacting a difunctional carboxylic acid with diphenols and carbonate. The carbonate may include a diaryl carbonate such as diphenyl carbonate, and ethylene carbonate.

The polycarbonate resin may have a melt flow index (MFI) of about 3 to about 120 g/10 min when measuring at 310° C., under 1.2 kgf.

The polycarbonate resin composition may include the polycarbonate resin in an amount of about 5 wt % to about 89 wt %, for example about 10 wt % to about 80 wt %, based on the total weight of the polycarbonate resin composition. In some embodiments, the polycarbonate resin composition of the invention may include the polycarbonate resin (A) in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, or 89 wt %. Further, according to some embodiments of the present invention, the amount of the polycarbonate resin (A) can be in a range from about any of the foregoing amounts to about any other of the foregoing amounts.

A polycarbonate resin composition including the polycarbonate resin in an amount within these ranges can exhibit a good balance of properties such as impact strength, heat resistance, and workability.

(B) Polycarbonate-Polysiloxane Copolymer

The polycarbonate-polysiloxane copolymer includes a polycarbonate block and a polysiloxane block.

The polycarbonate block includes a structural unit derived from the polycarbonate resin A described herein.

The polysiloxane block may include a structural unit represented by the following Chemical Formula 2.

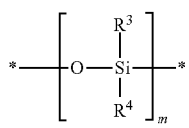

[Chemical Formula 2]

In the above Chemical Formula 2, $R^3$ and $R^4$ are the same or different and independently include hydrogen, substituted or unsubstituted C1 to C20 alkyl, substituted or unsubstituted C2 to C20 alkenyl, substituted or unsubstituted C2 to C20 alkynyl, substituted or unsubstituted C1 to C20 alkoxy, substituted or unsubstituted C3 to C30 cycloalkyl, substituted or unsubstituted C3 to C30 cycloalkenyl, substituted or unsubstituted C3 to C30 cycloalkynyl, substituted or unsubstituted C6 to C30 aryl, substituted or unsubstituted C6 to C30 aryloxy, or NRR' (wherein R and R' are the same or different and independently include hydrogen or substituted or unsubstituted C1 to C20 alkyl), and 2≤m<10,000.

In the above Chemical Formula 2, 2≤m<10,000, for example 2≤m<1,000. When m is within the above range, the polycarbonate resin composition of the invention can exhibit excellent impact resistance and can be appropriate for an extrusion process because it can maintain a suitable viscosity.

The polycarbonate-polysiloxane copolymer may include about 1 wt % to about 99 wt % of the polycarbonate block and about 1 wt % to about 99 wt % of the polysiloxane block, for example about 40 wt % to about 80 wt % of the polycarbonate block and about 20 wt % to about 60 wt % of the polysiloxane block.

In some embodiments, the polycarbonate-polysiloxane copolymer may include the polycarbonate block in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polycarbonate block can be in a range from about any of the foregoing amounts to about any other of the foregoing amounts.

In some embodiments, the polycarbonate-polysiloxane copolymer may include the polysiloxane block in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polysiloxane block can be in a range from about any of the foregoing amounts to about any other of the foregoing amounts.

When the polycarbonate block and the polysiloxane block are included in an amount in the above ratios, impact resistance may be improved.

The polycarbonate-polysiloxane copolymer may have a weight average molecular weight of about 10,000 g/mol to about 30,000 g/mol, for example about 15,000 g/mol to about 22,000 g/mol. When the polycarbonate-polysiloxane copolymer has a weight average molecular weight within the above the range, impact resistance may be improved.

Impact resistance of a polycarbonate resin composition may be deteriorated by an acrylic resin, including the modified acrylic-based copolymer, which is described below. The polycarbonate-polysiloxane copolymer, however, may minimize the deterioration of the impact resistance.

The polycarbonate resin composition of the invention can include the polycarbonate-polysiloxane copolymer in an amount of about 10 wt % to about 94 wt %, for example about 15 wt % to about 90 wt % based on the total weight of the polycarbonate resin composition.

In some embodiments, the polycarbonate resin composition of the invention may include the polycarbonate-polysiloxane copolymer (B) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, or 94 wt %. Further, according to some embodiments of the present invention, the amount of the polycarbonate-polysiloxane copolymer (B) can be in a range from about any of the foregoing amounts to about any other of the foregoing amounts.

When the polycarbonate-polysiloxane copolymer is included in an amount within the above ranges, the composition can exhibit a good balance of properties such as impact strength, heat resistance and workability.

(C) Modified Acrylic-Based Copolymer

The modified acrylic-based copolymer is a copolymer or a combination of copolymers of an aromatic acrylic-based compound, an alicyclic acrylic-based compound, or a combination thereof, and a compound that is capable of being copolymerized with the aromatic acrylic-based compound, the alicyclic acrylic-based compound, or the combination thereof.

The terms "aromatic acrylic-based compound" and "alicyclic acrylic-based compound" refer to a (meth)acrylate compound substituted with an aromatic compound or alicyclic compound, respectively. The aromatic compound may include a substituted or unsubstituted C6 to C30 aryl compound or a substituted or unsubstituted C6 to C30 aryloxy compound, and the alicyclic compound may include a substituted or unsubstituted C3 to C30 cycloalkyl compound, a substituted or unsubstituted C3 to C30 cycloalkenyl compound, or a substituted or unsubstituted C3 to C30 cycloalkynyl compound.

Examples of the aromatic and/or alicyclic acrylic-based compound include without limitation cyclohexyl(meth)acrylate, ethylphenoxy(meth)acrylate, 2-ethylthiophenyl(meth)acrylate, 2-ethylaminophenyl(meth)acrylate, phenyl(meth)acrylate, benzyl(meth)acrylate, 2-phenylethyl(meth)acrylate, 3-phenylpropyl(meth)acrylate, 4-phenylbutyl(meth)acrylate, 2-(2-methylphenyl)ethyl(meth)acrylate, 2-(3-methylphenyl)ethyl(meth)acrylate, 2-(4-methylphenyl)ethyl(meth)acrylate, 2-(4-propylphenyl)ethyl(meth)acrylate, 2-(4-(1-methylethyl)phenyl)ethyl(meth)acrylate, 2-(4-methoxyphenyl)ethyl(meth)acrylate, 2-(4-cyclohexylphenyl)ethyl(meth)acrylate, 2-(2-chlorophenyl)ethyl(meth)acrylate, 2-(3-chlorophenyl)ethyl(meth)acrylate, 2-(4-chlorophenyl)ethyl(meth)acrylate, 2-(4-bromophenyl)ethyl(meth)acrylate, 2-(3-phenylphenyl)ethyl(meth)acrylate, 2-(4-benzylphenyl)ethyl(meth)acrylate, and the like, and combinations thereof. In exemplary embodiments, the aromatic and/or alicyclic acrylic-based compound can be cyclohexyl(meth)acrylate, ethylphenoxy(meth)acrylate, phenyl(meth)acrylate, or a combination thereof.

The modified acrylic-based copolymer includes an aromatic and/or alicyclic acrylic-based compound such as the above-mentioned compounds, so it may provide an excellent appearance quality with excellent coloring properties. In addition, the refractive index of the modified acrylic-based copolymer is increased compared conventional acrylic-based copolymers, so as to provide excellent compatibility when blending with polycarbonate resin. Accordingly, the polycarbonate resin composition can have improved scratch resistance, coloring properties and transparency.

The compound that is capable of being copolymerized with the aromatic and/or alicyclic acrylic-based compound is a monofunctional unsaturated compound. Examples of the monofunctional unsaturated compound include without limitation alkyl methacrylates such as methyl methacrylate, ethyl methacrylate, propyl methacrylate, butyl methacrylate, and the like; alkyl acrylates such as methyl acrylate, ethyl acrylate, propyl acrylate, butyl acrylate, 2-ethylhexyl acrylate, and the like; unsaturated carboxylic acids such as acrylic acid, methacrylic acid, and the like; acid anhydrides such as maleic anhydride; (meth)acrylates having a hydroxyl such as 2-hydroxyethylacrylate, 2-hydroxypropylacrylate, monoglycerolacrylate, and the like; amides such as acrylamide, methacrylamide, and the like; nitriles such as acrylonitrile, methacrylonitrile, and the like; epoxy group containing compounds such as allyl glycidylether, glycidylmethacrylate, and the like; aromatic vinyl compounds such as styrene, α-methylstyrene, and the like; and combinations thereof. In exemplary embodiments, the monofunctional unsaturated compound includes an alkyl methacrylate or an alkyl acrylate. As used herein with reference to the alkyl methacrylates and alkyl acrylates, the term "alkyl" can include C1-C10 alkyl.

The modified acrylic-based copolymer may include a copolymer of methyl methacrylate and phenyl methacrylate.

The modified acrylic-based copolymer may be a copolymer of about 20 wt % to about 99.9 wt % of the aromatic and/or alicyclic acrylic-based compound and about 0.1 wt % to about 80 wt % of the compound that is capable of being copolymerized therewith, for example about 40 wt % to about 80 wt % of the aromatic and/or alicyclic acrylic-based compound and about 20 wt % to about 60 wt % of the compound that is capable of being copolymerized therewith.

In some embodiments, the modified acrylic-based copolymer may include the aromatic and/or alicyclic acrylic-based compound in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.1, 99.2, 99.3, 99.4, 99.5, 99.6, 99.7, 99.8, or 99.9 wt %. Further, according to some embodiments of the present invention, the amount of the aromatic and/or alicyclic acrylic-based compound can be in a range from about any of the foregoing amounts to about any other of the foregoing amounts.

In some embodiments, the modified acrylic-based copolymer may include the compound that is capable of being copolymerized with the aromatic and/or alicyclic acrylic-based compound in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the compound that is capable of being copolymerized with the aromatic and/or alicyclic acrylic-based compound can be in a range from about any of the foregoing amounts to about any other of the foregoing amounts.

When the aromatic and/or alicyclic acrylic-based compound and the compound that is capable of being copolymerized therewith are polymerized in amounts within the above ratios, the modified acrylic-based copolymer may have an average refractive index of about 1.495 or more.

The modified acrylic-based copolymer may be prepared in accordance with conventional polymerization processes, such as bulk polymerization, emulsion polymerization, and suspension polymerization.

The modified acrylic-based copolymer has a higher refractive index than conventional acrylic-based copolymer resins. Accordingly, the modified acrylic-based copolymer may have the same or similar refractive index as the polycarbonate resin, for example, a refractive index ranging from about 1.495 to about 1.59, or ranging from about 1.51 to about 1.59. When the modified acrylic-based copolymer has an increased refractive index, for example, a refractive index within these ranges, it may have excellent compatibility on blending with the polycarbonate resin. For example, when the modified acrylic-based copolymer is blended with the polycarbonate resin, it can be uniformly blended with the polycarbonate resin due to the improved compatibility and the increased refractive index of the modified acrylic-based copolymer. Accordingly, it may reduce the deterioration of transparency and coloring properties caused by the refractive index difference in a conventional polycarbonate/acrylic resin mixture. Accordingly, it may improve the scratch resistance as well as the coloring properties and transparency of polycarbonate resin.

The modified acrylic-based copolymer can have a weight average molecular weight of about 5,000 g/mol to about 100,000 g/mol, for example about 5,000 g/mol to about 50,000 g/mol, and as another example about 10,000 g/mol to about 40,000 g/mol. When the modified acrylic-based copolymer has a weight-average molecular weight within the above ranges, it may exhibit reduced carbonization or decomposition during compounding, and may exhibit excellent compatibility and transparency with the polycarbonate resin.

The polycarbonate resin composition of the invention may include the modified acrylic-based copolymer resin in an amount of about 1 wt % to about 70 wt %, for example about 4 wt % to about 50 wt %, based on the total weight of the polycarbonate resin composition. In some embodiments, the polycarbonate resin composition of the invention may include the modified acrylic-based copolymer resin (C) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount, of the modified acrylic-based copolymer resin (C) can be in a range from about any of the foregoing amounts to about any other of the foregoing amounts.

When the polycarbonate resin composition of the invention includes the modified acrylic-based copolymer resin in an amount within these ranges, the polycarbonate resin composition can exhibit excellent compatibility, impact resistance, and scratch resistance.

The polycarbonate-polysiloxane copolymer (B) and the modified acrylic-based copolymer (C) may be mixed at a weight ratio of about 12:88 to about 99:1, for example about 15:85 to about 90:10. When they are mixed within the above weight ratio, the polycarbonate resin composition can exhibit a balance of various properties such as impact resistance, scratch resistance, transparency, heat resistance, fluidity, and coloring properties.

(D) Other Additive(s)

The polycarbonate resin composition according to one embodiment may further include one or more additive(s) such as but not limited to an antibacterial agent, a heat stabilizer, an antioxidant, a release agent, a light stabilizer, an inorganic material additive, a surfactant, a coupling agent, a plasticizer, an admixture, a stabilizer, a lubricant, an antistatic agent, a coloring aid, a flame proofing agent, a weather-resistance agent, a colorant, an ultraviolet (UV) to absorber, an ultraviolet (UV) blocking agent, a flame retardant, a filler, a nucleating agent, an adhesion aid, an adhesive, or a combination thereof.

Exemplary antioxidants may include without imitation phenol-type antioxidants, phosphite-type antioxidants, thio-ether-type antioxidants, amine-type antioxidants, and the like, and combinations thereof. Exemplary release agents may include without limitation fluorine-including polymers, silicone oils, metal salts of stearic acid, metal salts of montanic acid, montanic acid ester waxes, polyethylene waxes, and the like, and combinations thereof. Exemplary weather-resistance agents may include without limitation benzophenone-type weather-resistance agents, amine-type weather-resistance agents, and the like, and combinations thereof. Exemplary colorants may include without limitation dye, pigments, and the like, and combinations thereof. Exemplary ultraviolet (UV) blocking agents may include without limitation titanium dioxide ($TiO_2$), carbon black, and the like, and combinations thereof. Exemplary filler may include without limitation glass fiber, carbon fiber, silica, mica, alumina, clay, calcium carbonate, calcium sulfate, glass beads, and the like, and combinations thereof. Exemplary nucleating agents may include without limitation talc, clay, and the like, and combinations thereof.

The carbon black may be any conductive carbon black without limitation, and can include without limitation graphitized carbon, furnace black, acetylene black, ketjen black, and the like, and combinations thereof.

The additive may be included in a predetermined amount as long as it does not deteriorate the properties of the polycarbonate resin composition. In one embodiment, the polycarbonate resin composition may include the additive(s) in an amount of about 40 parts by weight or less, for example about 0.1 to about 30 parts by weight, based on 100 parts by weight of the polycarbonate resin composition.

The polycarbonate thermoplastic resin composition may be prepared using any conventional generally known method. For example, each component of the composition and optional additive(s) can be mixed and melt-extruded using a conventional extruder. The composition can be extruded as pellets (which pellets can be subsequently processed to form the desired product) or directly extruded or processed into the desired product.

According to another embodiment, a product molded using the polycarbonate thermoplastic resin composition according to the invention is provided. The polycarbonate resin composition may be made into a molded product using various methods known in the art, such as but not limited to injection molding, blow molding, extrusion molding, thermal molding, and the like. The polycarbonate resin composition of the invention may be particularly useful in the production of various molded products requiring impact resistance, scratch resistance, transparency, and heat resistance, such as electronic parts, automobile parts, and the like.

The following examples illustrate this disclosure in more detail. However, it is understood that this disclosure is not limited by these examples.

A polycarbonate resin composition according to one embodiment includes each component as follows.

(A) Polycarbonate Resin (A-1) An INFINO polycarbonate having a MFI (310° C., 1.2 kgf) of 8 g/10 min manufactured by Cheil Industries is used.

(A-2) An INFINO polycarbonate having a MFI (310° C., 1.2 kgf) of 19 g/10 min manufactured by Cheil Industries is used.

(A') Acrylonitrile-Butadiene-Styrene (ABS) Resin

An ABS resin SD-0150 manufactured by Cheil Industries is used.

(B) Polycarbonate-Polysiloxane Copolymer

A polycarbonate-polysiloxane copolymer Tarflon manufactured by IDEMITSU is used.

(C) Modified Acrylic-Based Copolymer (C-1) A copolymer having a weight average molecular weight of 20,000 g/mol and prepared by suspension polymerizing 65 wt % of methyl methacrylate and 35 wt % of phenyl methacrylate is used.

(C-2) A copolymer having a weight average molecular weight of 40,000 g/mol and prepared by suspension polymerizing 65 wt % of methyl methacrylate and 35 wt % of phenyl methacrylate is used.

(C') Polymethylmethacrylate (PMMA)

A PMMA L-84® having a weight average molecular weight of 90,000 g/mol and manufactured by LG MMA is used.

(D) Additive

The carbon black Hi-BLACK manufactured by Korea Carbon Black is used.

(E) Rubber

An impact modifier C-223A manufactured by MITSUBISHI RAYON COMPANY is used.

Examples 1 to 14 and Comparative Examples 1 to 8

Polycarbonate resin compositions are prepared using the foregoing components in the amounts shown in Tables 1 to 3.

The types and amounts of components shown in Table 1 to 3 are mixed, extruded using a 45φ twin-screw extruder, and dried in a dehumidifying drier at 1000° C. for 4 hours to provide extruded pellets.

Experimental Example

The obtained pellets are dried at 80° C. for 4 hours and injection molded using a 6 oz injection molding machine at a cylinder temperature of 210 to 230° C., a mold temperature of 100° C., and a molding cycle time of 30 seconds to provide ASTM dumb-bell specimens for measuring the physical properties. The physical properties of the specimens are measured by the following methods, and the results are shown in the following Tables 1 to 3.

1) Transmittance: 2.8 T specimen is measured according to ASTM D1003.

2) Haze: 2.8 T specimen is measured according to ASTM D1003.

3) Pencil hardness: The specimen is allowed to stand at 23° C., at a relative humidity of 50% for 48 hours and measured for a pencil hardness according to JIS K5401 standard. In accordance with JIS K5401, a specimen having a weight of 500 g, a thickness of 3 mm, a length of 10 cm, and a width of 10 cm is prepared at 23° C. and observed for scratches using the naked eye after scratching the surface of the specimen five times. The pencil hardness level is rated when the pencil scratch is marked two or more times on the surface of a specimen.

(Level of Pencil Hardness)

6B-5B-4B-3B-2B-B-HB-F-H-2H-3H-4H-5H-6H

Softer Harder

4) BSP (Ball type Scratch Profile) width: A tungsten carbide stylus with a ball tip having a diameter of 0.7 mm is weighted with a load of 1 kgf and the specimen is scratched using the same at a speed of 75 mm/min. The specimen is then measured for roughness and scratch width using a surface profiler.

5) FDI (Falling Dart Impact): FDI fracture energy of the specimens is measured at a low temperature (−30° C.) according to ASTM D5420. The FDI of a square specimen having a 3.2 T thickness is measured by dropping a weight from a 1 m height under a load of 7 kgf, observing the state of the specimen, and measuring the absorption energy when the specimen is broken.

6) Unnotched-IZOD impact strength: Measured using an unnotched-IZOD specimen having a thickness of ⅛" according to ASTM D256.

7) Thermal distortion temperature: Measured under a load of 18.56 kgf according to ASTM D648.

8) MFI (Melt Flow Index): Measured at 250° C. under a load of 10 kgf according to ASTM D1238.

9) Coloring properties: The injected color chip specimen is observed by the naked eye according to a Cheil method.

⊚: Superior

○: fair

X: Inferior

TABLE 1

|  |  | Examples | | | | | | Comparative Examples | |
|---|---|---|---|---|---|---|---|---|---|
|  |  | 1 | 2 | 3 | 4 | 5 | 6 | 1 | 2 |
| (A) polycarbonate resin (wt %) | A-1 | 50 | 40 | 30 | 20 | 10 | 40 | 60 | 60 |
|  | A-2 | — | — | — | — | — | — | — | — |
| (B) polycarbonate-polysiloxane copolymer (wt %) |  | 40 | 40 | 40 | 40 | 40 | 40 | 40 | — |
| (C) modified acrylic-based copolymer (wt %) | C-1 | 10 | 20 | 30 | 40 | 50 | — | — | 40 |
|  | C-2 | — | — | — | — | — | 20 | — | — |
| transmittance (%) |  | 90 | 90 | 90 | 90 | 90 | 85 | 90 | 90 |
| haze (%) |  | 0.8 | 0.8 | 0.8 | 0.8 | 0.8 | 2.0 | 0.8 | 0.8 |
| pencil hardness (level) |  | F | H | H | 2H | 3H | H | 2B | 2H |
| BSP width (μm) |  | 270 | 255 | 250 | 240 | 230 | 258 | 330 | 240 |
| Unnotched IZOD impact strength (kgf · cm/cm) |  | N.B.* | N.B.* | 160 | 100 | 80 | N.B.* | N.B.* | 20 |
| thermal distortion temperature (° C.) |  | 115 | 109 | 104 | 100 | 95 | 110 | 120 | 100 |

*N.B.: No Break

TABLE 2

|  |  | Examples | | | | Comparative Examples | |
|---|---|---|---|---|---|---|---|
|  |  | 7 | 8 | 9 | 10 | 3 | 4 |
| (A) polycarbonate resin (wt %) | A-1 | 70 | 50 | 30 | 10 | 80 | 80 |
|  | A-2 | — | — | — | — | — | — |
| (B) polycarbonate-polysiloxane copolymer (wt %) |  | 10 | 30 | 50 | 70 | — | 20 |
| (C) modified acrylic-based copolymer (wt %) | C-1 | 20 | 20 | 20 | 20 | 20 | — |
|  | C-2 | — | — | — | — | — | — |
| transmittance (%) |  | 90 | 90 | 90 | 90 | 90 | 90 |
| haze (%) |  | 0.8 | 0.8 | 0.8 | 0.8 | 0.8 | 0.8 |
| pencil hardness (level) |  | H | H | H | H | H | 2B |
| BSP width (μm) |  | 250 | 252 | 255 | 258 | 255 | 325 |
| IZOD impact strength (kgf · cm/cm) |  | 180 | N.B.* | N.B.* | N.B.* | 30 | N.B.* |
| thermal distortion temperature (° C.) |  | 109 | 109 | 109 | 109 | 109 | 120 |

TABLE 3

|  |  | Examples | | | | Comparative Examples | | | |
| --- | --- | --- | --- | --- | --- | --- | --- | --- | --- |
|  |  | 11 | 12 | 13 | 14 | 5 | 6 | 7 | 8 |
| (A) polycarbonate resin (wt %) | A-1 | 40 | 20 | — | 25 | 40 | 50 | 20 | 40 |
|  | A-2 | — | 20 | 40 | — | 40 | 50 | 50 | — |
| (A') ABS resin (wt %) |  | — | — | — | — | — | — | 30 | — |
| (B) polycarbonate-polysiloxane copolymer (wt %) |  | 40 | 40 | 40 | 55 | — | — | — | 40 |
| (C) modified acrylic-based copolymer (wt %) | C-1 | 20 | 20 | 20 | 20 | 20 | — | — | — |
|  | C-2 | — | — | — | — | — | — | — | — |
| (C') polymethylmethacrylate (wt %) |  | — | — | — | — | — | — | — | 20 |
| (D) carbon black (parts by weight**) |  | 0.2 | 0.2 | 0.2 | 0.2 | 0.2 | 0.2 | 0.2 | 0.2 |
| (E) rubber (parts by weight**) |  | — | — | — | — | — | 4 | — | — |
| pencil hardness (level) |  | H | H | H | H | H | 2B | 2B | H |
| BSP width (μm) |  | 255 | 255 | 255 | 260 | 255 | 320 | 330 | 255 |
| FDI (J) |  | Ductile*** 60 | Ductile*** 58 | Ductile*** 55 | Ductile*** 56 | Brittle**** | Ductile*** 50 | Ductile*** 40 | Ductile*** 50 |
| IZOD impact strength kgf · cm/cm |  | N.B.* | N.B.* | N.B.* | N.B.* | 30 | N.B.* | N.B.* | N.B.* |
| thermal distortion temperature (° C.) |  | 109 | 108 | 106 | 106 | 109 | 122 | 110 | 110 |
| MFI (g/10 min) |  | 30 | 45 | 60 | 45 | 35 | 20 | 36 | 20 |
| coloring properties |  | ◎ | ◎ | ◎ | ◎ | ◎ | ○ | ○ | X |

**parts by weight: based on 100 parts per weight of a total weight of (A) polycarbonate resin, (B) polycarbonate-polysiloxane copolymer, and (C) modified acrylic-based copolymer.
***Ductile: "Ductile" state of specimen after measuring FDI, indicating the numeral value of FDI.
****Brittle: "Brittle" state of specimen after measuring FDI, indicating the numeral value of FDI when the specimen is broken by the ball drop at a low temperature (−30° C.).

Figure 2:
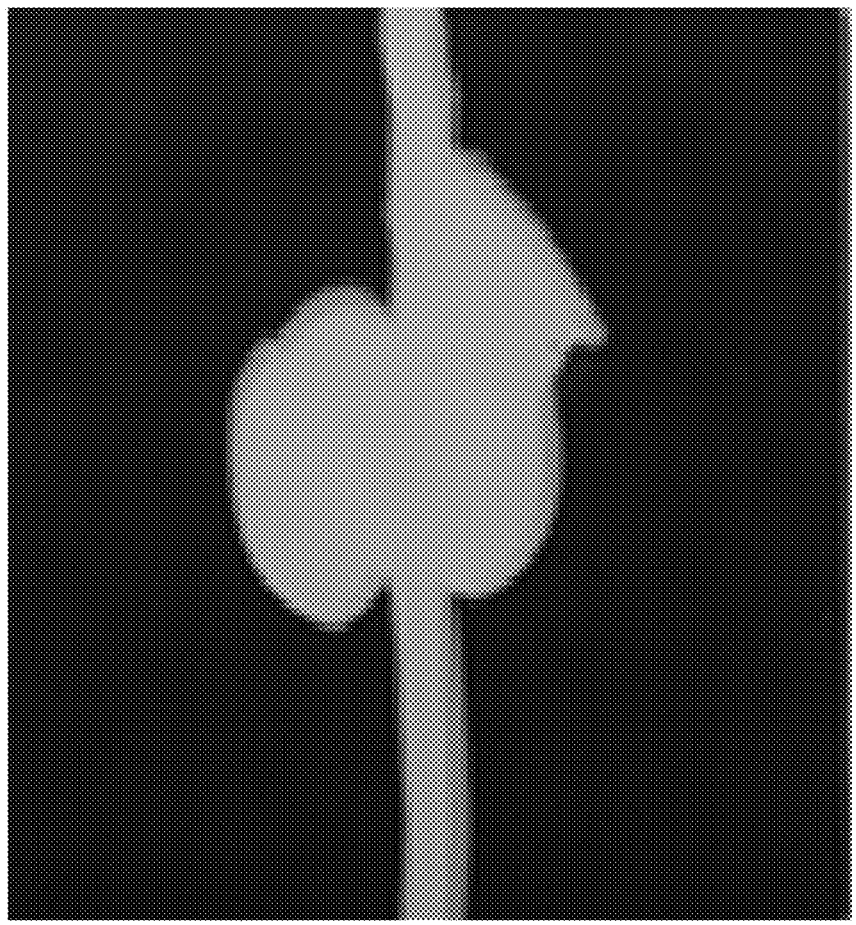
FIG. 2 is a photograph showing the brittle state of a specimen according to Comparative Example 5 after measuring FDI.

FIG. 1 is a photograph showing a "ductile" state of a specimen according to Example 11 after measuring FDI; and FIG. 2 is a photograph showing a "brittle" state of a specimen according to Comparative Example 5 after measuring FDI. The photographs of FIGS. 1 and 2 are of a sample having a size of 100 mm×100 mm.

Referring to FIGS. 1 and 2, it is understood that the specimens can be classified as "ductile" or "brittle" after applying an impact to the specimen. In this manner the impact resistance of molded products may be compared.

From Tables 1 to 3, Examples 1 to 14 including a polycarbonate resin, a polycarbonate-polysiloxane copolymer, and a modified acrylic-based copolymer according to one embodiment of the invention exhibit a better balance of physical properties such as superior transparency, scratch resistance, impact resistance, heat resistance, fluidity, and coloring properties than Comparative Examples 1 and 4 including no modified acrylic-based copolymer; Comparative Examples 2, 3, and 5 including no polycarbonate-polysiloxane copolymer; Comparative Examples 6 and 7 including no modified acrylic-based copolymer and no polycarbonate-polysiloxane copolymer; and Comparative Example 8 including polymethyl methacrylate instead of a modified acrylic-based copolymer.

In addition, the scratch resistance is improved by increasing the amount of modified acrylic-based copolymer from Examples 1 to 5, which include various amounts of modified acrylic-based copolymer together with a constant amount of polycarbonate-polysiloxane copolymer.

From Tables 1 and 2, Comparative Examples 2 and 3 including no polycarbonate-polysiloxane copolymer exhibit significantly deteriorated impact resistance; and Comparative Examples 1 and 4 including no modified acrylic-based copolymer exhibit significantly deteriorated scratch resistance.

In addition, Table 3 shows the colored appearance comparison using carbon black. Examples 11 to 14 have an excellent appearance quality due to the excellent coloring properties; but Comparative Examples 6 and 7 including a rubber and a ABS resin, respectively, for improving the impact resistance and Comparative Example 8 including polymethyl methacrylate had inferior appearance qualities as compared to Examples 11-14.

In addition, Example 12 which includes a mixture of two kinds of polycarbonate resins with different viscosities, does not exhibit a significant reduction of physical properties such as transparency, scratch resistance, impact resistance, heat resistance and the like. Thereby, the present invention can allow control of the viscosity of a molded product.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin composition comprising:
(A) about 5 wt % to about 89 wt % of a polycarbonate resin;
(B) about 10 wt % to about 94 wt % of a polycarbonate-polysiloxane copolymer; and (C) about 1 wt % to about 70 wt % of a modified acrylic-based copolymer, wherein the modified acrylic-based copolymer (C) is selected from the group consisting of copolymers formed by the polymerization of (c1) an aromatic acrylic-based compound, alicyclic acrylic-based compound, or a combination thereof; and (c2) a compound copolymerized therewith consisting of an alkyl methacrylate, an alkyl acrylate, an unsaturated carboxylic acid, maleic anhydride, an hydroxyl group-containing acrylate, acrylamide, methacrylamide, a nitrile, an epoxy group containing compound, styrene, α-methylstyrene, or a combination thereof.

2. The polycarbonate resin composition of claim 1, wherein the polycarbonate resin has a melt flow index (MFI) of about 3 to about 120 g/10 min.

3. The polycarbonate resin composition of claim 1, wherein the polycarbonate-polysiloxane copolymer comprises about 1 wt % to about 99 wt % of a polycarbonate block and about 1 wt % to about 99 wt % of a polysiloxane block.

4. The polycarbonate resin composition of claim 3, wherein the polycarbonate-polysiloxane copolymer comprises about 40 wt % to about 80 wt % of said polycarbonate block and about 20 wt % to about 60 wt % of said polysiloxane block.

5. The polycarbonate resin composition of claim 3, wherein the polysiloxane block includes a structural unit represented by the following Chemical Formula 2:

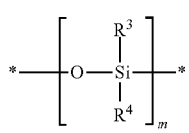

[Chemical Formula 2]

wherein:
R$^3$ and R$^4$ are the same or different and independently include hydrogen, substituted or unsubstituted C1 to C20 alkyl, substituted or unsubstituted C2 to C20 alkenyl, substituted or unsubstituted C2 to C20 alkynyl, substituted or unsubstituted C1 to C20 alkoxy, substituted or unsubstituted C3 to C30 cycloalkyl, substituted or unsubstituted C3 to C30 cycloalkenyl, substituted or unsubstituted C3 to C30 cycloalkynyl, substituted or unsubstituted C6 to C30 aryl, substituted or unsubstituted C6 to C30 aryloxy, or NRR', wherein R and R' are the same or different and independently include hydrogen or substituted or unsubstituted C1 to C20 alkyl, and 2<m<10,000.

6. The polycarbonate resin composition of claim 5, wherein 2<m<1,000.

7. The polycarbonate resin composition of claim 1, wherein the aromatic acrylic-based compound is selected from the group consisting of (meth)acrylate compounds substituted with substituted or unsubstituted C6 to C30 aryl and substituted or unsubstituted C6 to C30 aryloxy, and wherein the alicyclic acrylic-based compound is selected from the group consisting of (meth)acrylate compounds substituted with substituted or unsubstituted C3 to C30 cycloalkyl, substituted or unsubstituted C3 to C30 cycloalkenyl, and substituted or unsubstituted C3 to C30 cycloalkynyl.

8. The polycarbonate resin composition of claim 7, wherein the aromatic acrylic-based compound, the alicyclic acrylic-based compound, or the combination thereof is selected from the group consisting of cyclohexyl(meth)acrylate, ethylphenoxy(meth)acrylate, 2-ethylthiophenyl(meth) acrylate, 2-ethylaminophenyl(meth)acrylate, phenyl(meth) acrylate, benzyl(meth)acrylate, 2-phenylethyl(meth) acrylate, 3-phenylpropyl(meth)acrylate, 4-phenylbutyl (meth)acrylate, 2-(2-methylphenyl)ethyl(meth)acrylate, 2-(3-methylphenyl)ethyl(meth)acrylate, 2-(4-methylphenyl) ethyl(meth)acrylate, 2-(4-propylphenyl)ethyl(meth)acrylate, 2-(4-(1-methylethyl)phenyl)ethyl(meth)acrylate, 2-(4-methoxyphenyl)ethyl(meth)acrylate, 2-(4-cyclohexylphenyl) ethyl(meth)acrylate, 2-(2-chlorophenyl)ethyl(meth)acrylate, 2-(3-chlorophenyl)ethyl(meth)acrylate, 2-(4-chlorophenyl) ethyl(meth)acrylate, 2-(4-bromophenyl)ethyl(meth)acrylate, 2-(3-phenylphenyl)ethyl(meth)acrylate, 2-(4-benzylphenyl) ethyl(meth)acrylate, and combinations thereof.

9. The polycarbonate resin composition of claim 8, wherein the compound copolymerized with the aromatic acrylic-based compound, alicyclic acrylic-based compound, or combination thereof consists of methyl methacrylate, ethyl methacrylate, propyl methacrylate, butyl methacrylate, methyl acrylate, ethyl acrylate, propyl acrylate, butyl acrylate, 2-ethylhexyl acrylate, acrylic acid, methacrylic acid, maleic anhydride, 2-hydroxyethylacrylate, 2-hydroxypropylacrylate, monoglycerolacrylate, acrylamide, methacrylamide, acrylonitrile, methacrylonitrile, allyl glycidylether, glycidylmethacrylate, styrene, α-methylstyrene, or a combination thereof.

10. The polycarbonate resin composition of claim 8, wherein the compound copolymerized with the aromatic acrylic-based compound, alicyclic acrylic-based compound, or combination thereof consists of an alkyl methacrylate, alkyl acrylate, or a combination thereof.

11. The polycarbonate resin composition of claim 10, wherein the modified acrylic-based copolymer (C) is a copolymer formed by polymerizing methyl methacrylate and phenyl methacrylate.

12. The polycarbonate resin composition of claim 1, wherein the modified acrylic-based copolymer is a copolymer of about 20 wt % to about 99.9 wt % of the aromatic acrylic-based compound, alicyclic acrylic-based compound or combination thereof, and about 0.1 wt % to about 80 wt % of the compound copolymerized therewith.

13. The polycarbonate resin composition of claim 12, wherein the modified acrylic-based copolymer is a copolymer of about 40 wt % to about 80 wt % of the aromatic acrylic-based compound, alicyclic acrylic-based compound or combination thereof, and about 20 wt % to about 60 wt % of the compound copolymerized therewith.

14. The polycarbonate resin composition of claim 1, wherein the modified acrylic-based copolymer has a refractive index ranging from about 1.495 to about 1.59.

15. The polycarbonate resin composition of claim 1, wherein the modified acrylic-based copolymer has a weight average molecular weight of about 5,000 g/mol to about 50,000 g/mol.

16. The polycarbonate resin composition of claim 1, wherein the modified acrylic-based copolymer has a weight average molecular weight of about 10,000 g/mol to about 40,000 g/mol.

17. The polycarbonate resin composition of claim 1, wherein the polycarbonate-polysiloxane copolymer and the modified acrylic-based copolymer are mixed at a weight ratio of about 12:88 to about 99:1.

18. The polycarbonate resin composition of claim 1, wherein the polycarbonate-polysiloxane copolymer and the modified acrylic-based copolymer are mixed at a weight ratio of about 15:85 to about 90:10.

19. The polycarbonate resin composition of claim 1, comprising (A) about 10 wt % to about 80 wt % of the polycarbonate resin;
(B) about 15 wt % to about 90 wt % of the polycarbonate-polysiloxane copolymer; and
(C) about 4 wt % to about 50 wt % of the modified acrylic-based copolymer.

20. The polycarbonate resin composition of claim 1, wherein the polycarbonate resin composition further comprises an additive comprising an antibacterial agent, a heat stabilizer, an antioxidant, a release agent, a light stabilizer, an inorganic material additive, a surfactant, a coupling agent, a plasticizer, admixture, a stabilizer, a lubricant, an antistatic agent, a coloring aid, a flame proofing agent, a weather-resistance agent, a colorant, an ultraviolet (UV) absorber, an ultraviolet (UV) blocking agent, a flame retardant, a filler, a nucleating agent, an adhesion aid, an adhesive, or a combination thereof.

21. A molded product made from the polycarbonate resin composition according to claim 1.

22. The polycarbonate resin composition of claim 1, wherein the modified acrylic-based copolymer (C) consists of a copolymer or a combination of copolymers formed by the polymerization of monomers consisting of (c1) an aromatic acrylic-based compound, alicyclic acrylic-based compound, or a combination thereof and (c2) a compound copolymerized therewith consisting of an alkyl methacrylate, alkyl acrylate, unsaturated carboxylic acid, maleic anhydride, hydroxyl group-containing acrylate, acrylamide, methacrylamide, nitrile, epoxy group containing compound, styrene, α-methylstyrene, or a combination thereof.

23. The polycarbonate resin composition of claim 1, wherein the modified acrylic-based copolymer is a copolymer of about 20 wt % to about 80 wt % of the aromatic acrylic-based compound, alicyclic acrylic-based compound or combination thereof, and about 80 wt % to about 20 wt % of the compound copolymerized therewith.

24. The polycarbonate resin composition of claim 23, wherein the modified acrylic-based copolymer is a copolymer of about 30 wt % to about 70 wt % of the aromatic acrylic-based compound, alicyclic acrylic-based compound or combination thereof, and about 70 wt % to about 30 wt % of the compound copolymerized therewith.

25. The polycarbonate resin composition of claim 23, wherein the copolymerizable compound (c2) consists of methyl methacrylate, ethyl methacrylate, propyl methacrylate, butyl methacrylate, methyl acrylate, ethyl acrylate, propyl acrylate, butyl acrylate, 2-ethylhexyl acrylate, acrylic acid, methacrylic acid, maleic anhydride, 2-hydroxyethylacrylate, 2-hydroxypropylacrylate, monoglycerolacrylate, acrylamide, methacrylamide, acrylonitrile, methacrylonitrile, allyl glycidylether, glycidylmethacrylate, or a combination thereof.

26. The polycarbonate resin composition of claim 1, wherein (c1) includes an alicyclic acrylic-based compound.

* * * * *